US006955867B1

US006955867B1

(12) United States Patent
Otsuki et al.

(10) Patent No.: US 6,955,867 B1
(45) Date of Patent: Oct. 18, 2005

(54) NON-AQUEOUS ELECTROLYTE SECONDARY CELL AND, DETERIORATION-PREVENTING AGENT FOR NON-AQUEOUS ELECTROLYTE SECONDARY CELL AND ADDITIVE FOR NON-AQUEOUS ELECTROLYTE SECONDARY CELL FOR USE THEREIN

(75) Inventors: Masashi Otsuki, Musashimurayama (JP); Shigeki Endo, Tokorozawa (JP); Takao Ogino, Tokorozawa (JP)

(73) Assignee: Brigdestone Corporation, Tokyo (JP)

( * ) Notice: Subject to any disclaimer, the term of this patent is extended or adjusted under 35 U.S.C. 154(b) by 474 days.

(21) Appl. No.: 10/130,069

(22) PCT Filed: Nov. 15, 2000

(86) PCT No.: PCT/JP00/08041

§ 371 (c)(1),
(2), (4) Date: May 15, 2002

(87) PCT Pub. No.: WO01/39314

PCT Pub. Date: May 31, 2001

(30) Foreign Application Priority Data

Nov. 25, 1999 (JP) .......................................... 11/334953
Nov. 25, 1999 (JP) .......................................... 11/334954
Nov. 25, 1999 (JP) .......................................... 11/334955
Nov. 25, 1999 (JP) .......................................... 11/334956
Apr. 26, 2000 (JP) ....................................... 2000/126568
Apr. 26, 2000 (JP) ....................................... 2000/126569
Apr. 26, 2000 (JP) ....................................... 2000/126570
Apr. 26, 2000 (JP) ....................................... 2000/126571

(51) Int. Cl.$^7$ .............................................. H01M 8/00
(52) U.S. Cl. ..................................... 429/314; 429/315
(58) Field of Search ................................ 429/339, 314, 429/315, 324

(56) References Cited

U.S. PATENT DOCUMENTS

| 5,166,009 A | 11/1992 | Abraham et al. |
| 5,567,546 A | 10/1996 | Maly-Schreiber et al. |
| 5,830,600 A | 11/1998 | Narang et al. |
| 6,475,679 B1 * | 11/2002 | Tsutiya et al. .............. 429/339 |

FOREIGN PATENT DOCUMENTS

| JP | A 6-13108 | 1/1994 |
| JP | A 11-144757 | 5/1999 |
| JP | A 11-191431 | 7/1999 |
| JP | A 2000-21442 | 1/2000 |
| JP | A 2000-30740 | 1/2000 |
| JP | A 2001-23687 | 1/2001 |
| JP | A 2001-52736 | 2/2001 |

OTHER PUBLICATIONS

U.S. Appl. No. 10/758,130, filed Jan. 16, 2004, Otsuki, Masashi, Silicon Carbide Powder and Method for Producing the Same.

U.S. Appl. No. 10/494,936, filed Jan. 1, 2001, Otsuki, Masashi, Non–Aqueous Electrolyte Primary Cell and Additive for Non–Aqueous Electrolyte of the Cell.
U.S. Appl. No. 10/482,810, filed Jan. 5, 2004, Otsuki, Masashi, Non–Aqueous Electrolyte Cell, Electrolyte Stabilizing Agent, and Phosphazene Derivative and Method for Preparation Thereof.
U.S. Appl. No. 10/482,804, filed Jan. 5, 2004, Otsuki, Masashi, Polymer Cell and Polymer Electrolyte.
U.S. Appl. No. 10/470,080, filed Jul. 24, 2003, Otsuki, Masashi, Additive for Cell and Electric Double–Layered Capacitor.
U.S. Appl. No. 10/363,542, filed Mar. 5, 2003, Otsuki, Masashi, Additive for Non–Aqueous Liquid Electrolyte Secondary Cell, Non–Aqueous Liquid Electrolyte Secondary Cell, Additive for Non–Aqueous Liquid Electrolyte Electric Double Layer Capacitor and Non–Aqueous Liquid Electrolyte Electric Double Layer Capacitor.
U.S. Appl. No. 10/363,541, filed Mar. 5, 2003, Otsuki, Masashi, Additive for Non–Aqueous Liquid Electrolyte, Non–Aqueous Liquid Electrolyte Secondary Cell and Non–Aqueous Liquid Electrolyte Electric Double Layer Capacitor.
U.S. Appl. No. 10/363,172, filed Mar. 31, 2003, Otsuki, Masashi, Additive for Nonaqueous–Electrolyte Secondary Battery.
U.S. Appl. No. 10/363,171, filed May 5, 2003, Otsuki, Masashi, Additive for Non–Aqueous Liquid Electrolyte, Non–Aqueous Liquid Electrolyte Secondary Cell and Non–Aqueous Liquid Electrolyte Electric Double Layer Capacitor.

(Continued)

Primary Examiner—Michael Barr
Assistant Examiner—Monqiue Wills
(74) Attorney, Agent, or Firm—Oliff & Berridge, PLC

(57) ABSTRACT

An object of the present invention is to provide a non-aqueous electrolyte secondary cell having excellent resistance to deterioration, excellent self-extinguishability or incombustibility, and excellent discharge properties at low temperatures, a deterioration inhibitor for a non-aqueous electrolyte secondary cell which can improve resistance to deterioration, and an additive for a non-aqueous electrolyte which can improve self-extinguishability or incombustibility.

The non-aqueous electrolyte secondary cell has a positive electrode, a negative electrode, and, in a first aspect, a non-aqueous electrolyte containing at least 2% by volume and less than 20% by volume of a phosphazene derivative, and a supporting salt, and, in a second aspect, a non-aqueous electrolyte containing at least 20% by volume of the phosphazene derivative, and the supporting salt. The deterioration inhibitor for a non-aqueous electrolyte secondary cell and the additive for a non-aqueous electrolyte secondary cell are added to the non-aqueous electrolyte of the non-aqueous electrolyte secondary cell and contain at least the phosphazene derivative.

17 Claims, No Drawings

OTHER PUBLICATIONS

U.S. Appl. No. 10/293,560, filed Nov. 14, 2002, Otsuki, Masashi, Cleaning Vessel and Silicon Carbide Sintered Body Used Therefor.

U.S. Appl. No. 10/275,008, filed Oct. 31, 2002, Otsuki, Masashi, Nonaqueous Electrolyte Secondary Battery.

U.S. Appl. No. 10/161,715, filed Jun. 5, 2002, Otsuki, Masashi, Silicon Carbide Single Crystal and Production Thereof.

U.S. Appl. No. 10/131,091, now U.S. Pat. No. 6,733,736, filed Apr. 25, 2002, Otsuki, Masashi, Silicon Carbide Powder and Method for Producing the Same.

U.S. Appl. No. 10/130,069, filed May 15, 2002, Otsuki, Masashi, Non–Aqueous Electrolyte Secondary Cell and, Deterioration–Preventing Agent for Non–Aqueous Electrolyte Secondary Cell and Additive for Non–Aqueous Electrolyte Secondary Cell for Use Therein.

U.S. Appl. No. 10/048,054, filed Jan. 25, 2002, Otsuki, Masashi, Nonaqueous Electrolyte Secondary Cell.

U.S. Appl. No. 09/785,195, now U.S. Pat. No. 6,532,977, filed Feb. 20, 2001, Otsuki, Masashi, Cleaning Vessel and Silicon Carbide Sintered Body Used Therefor.

U.S. Appl. No. 09/708,717, now U.S. Pat. No. 6,452,782, filed Nov. 9, 2000, Otsuki, Masashi, Non–Aqueous Electrolyte Electric Double–Layer Capacitor, Deterioration Inhibitor for Non–Aqueous Electrolyte Electric Double–Layer Capacitor and Additive for Non–Aqueous Electrolyte Electric Double–Layer Capacitor.

U.S. Appl. No. 09/708,537, now U.S. Pat. No. 6,469,888, filed Nov. 9, 2000, Otsuki, Masashi, Non–Aqueous Electrolyte Electric Double–Layer Capacitor.

U.S. Appl. No. 09/579,064, now U.S. Pat. No. 6,375,752, filed May 26, 2000, Otsuki, Masashi, Method of Wet–Cleaning Sintered Silicon Carbide.

U.S. Appl. No. 09/570,723, now U.S. Pat. No. 6,261,370, filed May 15, 2000, Otsuki, Masashi, Product Holder.

U.S. Appl. No. 09/544,464, now U.S. Pat. No. 6,214,755, filed Apr. 7, 2000, Otsuki, Masashi, Method for Producing Sintered Silicon Carbide.

U.S. Appl. No. 09/449,764, now U.S. Pat. No. 6,419,757, filed Nov. 26, 1999, Otsuki, Masashi, Method for Cleaning Sintered Silicon Carbide in Wet Condition.

U.S. Appl. No. 09/137,750, now U.S. Pat. No. 6,090,733, filed Aug. 21, 1998, Otsuki, Masashi, Sintered Silicon Carbide and Method for Producing the Same.

U.S. Appl. No. 10/758,130, filed Jan. 16, 2004, Endo, Shigeki, Silicon Carbide Powder and Method for Producing the Same.

U.S. Appl. No. 10/482,810, filed Jan. 5, 2004, Endo, Shigeki, Non–Aqueous Electrolyte Cell, Electrolyte Stabilizing Agent, and Phosphazene Derivative and Method for Preparation Thereof.

U.S. Appl. No. 10/482,804, filed Jan. 5, 2004, Endo, Shigeki, Polymer Cell and Polymer Electrolyte.

U.S. Appl. No. 10/470,080, filed Jul. 24, 2003, Endo, Shigeki, Additive for Cell and Electric Double–Layered Capacitor.

U.S. Appl. No. 10/450,151, filed Jun. 11, 2003, Endo, Shigeki, Silicon Carbide Single Crystal and Method and Apparatus for Producing the Same.

U.S. Appl. No. 10/363,542, filed Mar. 5, 2003, Endo, Shigeki, Additive for Non–Aqueous Liquid Electrolyte Secondary Cell, Non–Aqueous Liquid Electrolyte Secondary Cell, Additive for Non–Aqueous Liquid Electrolyte Electric Double Layer Capacitor and Non–Aqueous Liquid Electrolyte Electric Double Layer Capacitor.

U.S. Appl. No. 10/363,541, filed Mar. 5, 2003, Endo, Shigeki, Additive for Non–Aqueous Liquid Electrolyte, Non–Aqueous Liquid Electrolyte Secondary Cell and Non–Aqueous Liquid Electrolyte Electric Double Layer Capacitor.

U.S. Appl. No. 10/363,172, filed Mar. 31, 2003, Endo, Shigeki, Additive for Nonaqueous–Electrolyte Secondary Battery.

U.S. Appl. No. 10/363,171, filed May 5, 2003, Endo, Shigeki, Additive for Non–Aqueous Liquid Electrolyte, Non–Aqueous Liquid Electrolyte Secondary Cell and Non–Aqueous Liquid Electrolyte Electric Double Layer Capacitor.

U.S. Appl. No. 10/293,560, filed Nov. 14, 2002, Endo, Shigeki, Cleaning Vessel and Silicon Carbide Sintered Body Used Therefor.

U.S. Appl. No. 10/275,008, filed Oct. 31, 2002, Endo, Shigeki, Nonaqueous Electrolyte Secondary Battery.

U.S. Appl. No. 10/161,715, filed Jun. 5, 2002, Endo, Shigeki, Silicon Carbide Single Crystal and Production Thereof.

U.S. Appl. No. 10/131,091, now U.S. Pat. No. 6,733,736, filed Apr. 25, 2002, Endo, Shigeki, Silicon Carbide Powder and Method for Producing the Same.

U.S. Appl. No. 10/130,069, filed May 15, 2002, Endo, Shigeki, Non–Aqueous Electrolyte Secondary Cell and, Deterioration–Preventing Agent for Non–Aqueous Electrolyte Secondary Cell and Additive for Non–Aqueous Electrolyte Secondary Cell for Use Therein.

U.S. Appl. No. 10/087,914, filed Mar. 5, 2002, Endo, Shigeki, Particles for Electro–Rheological Fluid.

U.S. Appl. No. 10/048,054, filed Jan. 25, 2002, Endo, Shigeki, Nonaqueous Electrolyte Secondary Cell.

U.S. Appl. No. 09/785,195, now U.S. Pat. No. 6,532,977, filed Feb. 20, 2001, Endo, Shigeki, Cleaning Vessel and Silicon Carbide Sintered Body Used Thereof.

U.S. Appl. No. 09/708,717, now U.S. Pat. No. 6,452,782, filed Nov. 9, 2000, Endo, Shigeki, Non–Aqueous Electrolyte Electric Double–Layer Capacitor, Deterioration Inhibitor for Non–Aqueous Electrolyte Electric Double–Layer Capacitor and Additive for Non–Aqueous Electrolyte Electric Double–Layer Capacitor.

U.S. Appl. No. 09/708,537, now U.S. Pat. No. 6,469,888, filed Nov. 9, 2000, Endo, Shigeki, Non–Aqueous Electrolyte Electric Double–Layer Capacitor.

U.S. Appl. No. 09/579,064, now U.S. Pat. No. 6,375,752, filed May 26, 2000, Endo, Shigeki, Method of Wet–Cleaning Sintered Silicon Carbide.

U.S. Appl. No. 09/576,217, now U.S. Pat. No. 6,6,627,169, filed May 23, 2000, Endo, Shigeki, Silicon Carbide Powder and Production Method Thereof.

U.S. Appl. No. 09/570,723, now U.S. Pat. No. 6,261,370, filed May 15, 2000, Endo, Shigeki, Product Holder.

U.S. Appl. No. 09/323,915, now U.S. Pat. No. 6,352,651, filed Jun. 2, 1999, Endo, Shigeki, Electrorheological Fluid.

U.S. Appl. No. 09/200,457, now U.S. Pat. No. 6,277,306, filed Nov. 27, 1998, Endo, Shigeki, Electro–Rheological Fluid Having High Dielectric Breakdown Strength and Methods of Making and Storing the Electro–Rheological Fluid.

U.S. Appl. No. 08/921,537, filed Sep. 2, 1997, Endo, Shigeki, Particles for Electro–Rheological Fluid.

U.S. Appl. No. 07/831,677, now U.S. Pat. No. 5,267,633, filed Feb. 5, 1992, Endo, Shigeki, Electrorheological Fluid–Applied Apparatus, Electrorheological Fluid——Applied Vibration Controller, and Electrorheological Fluid–Applied Fixing Apparatus.

U.S. Appl. No. 07/683,486, now U.S. Pat. No. 5,164,105, filed Apr. 9, 1991, Endo, Shigeki, Electroviscous Fluid.

U.S. Appl. No. 07/682,946, now U.S. Pat. No. 5,252,249, filed Apr. 10, 1991, Endo, Shigeki, Powder and Electrorheological Fluid.

U.S. Appl. No. 07/658,709, now U.S. Pat. No. 5,252,250, filed Feb. 21, 1991, Endo, Shigeki, Electrorheological Fluids Comprising Dielectric Particulates Dispersed in a Highly Electrically Insulating Oily Medium.

U.S. Appl. No. 07/404,490, now U.S. Pat. No. 5,030,393, filed Sep. 8, 1989, Endo, Shigeki, Method of Producing Thermoplastic Polymer Film.

U.S. Appl. No. 07/400,134, now U.S. Pat. No. 5,087,382, filed Aug. 29, 1989, Endo, Shigeki, Electroviscous Fluid.

U.S. Appl. No. 07/334,305, filed Apr. 6, 1989, Endo, Shigeki, Electroviscous Fluid.

U.S. Appl. No. 07/289,399, now U.S. Pat. No. 4,875,918, filed Dec. 19, 1988, Endoh, Shigeki, Method of Manufacturing Fiber Preform for Single–Mode Fibers.

U.S. Appl. No. 07/070,001, filed Jul. 6, 1987, Endoh, Shigeki, Method of Manufacturing Fiber Preform for Single–Mode Fibers.

U.S. Appl. No. 06/940,203, now U.S. Pat. No. 4,713,107, filed Dec. 10, 1986, Endo, Shigeki, Apparatus for Producing Porous Preforms for Optical Fibers.

U.S. Appl. No. 06/720,223, filed Apr. 5, 1985, Endo, Shigeki, Apparatus for Producing Porous Preforms for Optical Fibers.

U.S. Appl. No. 10/482,810, filed Jan. 5, 2004, Ogino, Takao, Non–Aqueous Electrolyte Cell, Electrolyte Stabilizing Agent, and Phosphazene Derivative and Method for Preparation Thereof.

U.S. Appl. No. 10/482,804, filed Jan. 5, 2003, Ogino, Takao, Polymer Cell and Polymer Electrolyte.

U.S. Appl. No. 10/470,080, filed Jul. 24, 2003, Ogino, Takao, Additive for Cell and Electric Double–Layered Capacitor.

U.S. Appl. No. 10/363,542, filed Mar. 5, 2003, Ogino, Takao, Additive for Non–Aqueous Liquid Electrolyte Secondary Cell, Non–Aqueous Liquid Electrolyte Secondary Cell, Additive for Non–Aqueous Liquid Electrolyte Electric Double–Layer Capacitor and Non–Aqueous Liquid Electrolyte Electric Double Layer Capacitor.

U.S. Appl. No. 10/363,541, filed Mar. 5, 2003, Ogino, Takao, Additive for Non–Aqueous Liquid Electrolyte, Non–Aqueous Liquid Electrolyte Secondary Cell and Non– Aqueous Liquid Electrolyte Electric Double Layer Capacitor.

U.S. Appl. No. 10/363,172, filed Mar. 31, 2003, Ogino, Takao, Additive for Nonaqueous–Electrolyte Secondary Battery.

U.S. Appl. No. 10/363,171, filed May 5, 2003, Ogino, Takao, Additive for Non–Aqueous Liquid Electrolyte, Non–Aqueous Liquid Electrolyte Secondary Cell and Non– Aqueous Liquid Electrolyte Electric Double Layer Capacitor.

U.S. Appl. No. 10/275,008, filed Oct. 31, 2002, Ogino, Takao, Nonaqueous Electrolyte Secondary Battery.

U.S. Appl. No. 10/220,106, now U.S. Pat. No. 6,706,328, filed Dec. 23, 2002, Ogino, Takao, Metal Sheet Material With Superior Corrosion Resistance.

U.S. Appl. No. 10/130,069, filed May 15, 2002, Ogino, Takao, Non–Aqueous Electrolyte Secondary Cell and, Deterioration–Preventing Agent for Non–Aqueous Electrolyte Secondary Cell and Additive for Non–Aqueous Electrolyte Secondary Cell for Use Therein.

U.S. Appl. No. 10/048,054, filed Jan. 25, 2002, Ogino, Takao, Nonaqueous Electrolyte Secondary Cell.

U.S. Appl. No. 09/708,717, now U.S. Pat. No. 6,452,782, filed Nov. 9, 2000, Ogino, Takao, Non–Aqueous Electrolyte Electric Double–Layer Capacitor, Deterioration Inhibitor for Non–Aqueous Electrolyte Electric Double–Layer Capacitor and Additive for Non–Aqueous Electrolyte Electric Double–Layer Capacitor.

U.S. Appl. No. 09/708,537, now U.S. Pat. No. 6,469,888, filed Nov. 9, 2000, Ogino, Takao, Non–Aqueous Electrolyte Electric Double–Layer Capacitor.

U.S. Appl. No. 08/687,390, now U.S. Pat. No. 5,846,342, filed Aug. 2, 1996, Ogino, Takao, Surface Treatment Agent for Zinciferous–Plated Steel.

U.S. Appl. No. 08/667,932, now U.S. Pat. No. 5,779,880, filed Jun. 24, 2996, Ogino, Takao, Carbonaceous Powder to be Dispersed in Electrorheological Fluid and Electrorheological Fluid Using the Same.

U.S. Appl. No. 08/596,289, filed Feb. 14, 1996, Ogino, Takao, Process for Treating Zinciferous Surfaces.

U.S. Appl. No. 08/535,253, now U.S. Pat. No. 5,700,334, filed Nov. 28, 1995, Ogino, Takao, Composition and Process for Imparting a Bright Blue Color to Zinc/Aluminum Alloy.

U.S. Appl. No. 08/347,061, filed Nov. 23, 1994, Ogino, Takao, Carbonaceous Powder to be Dispersed in Electrorheological Fluid and Electrorheological Fluid Using the Same.

U.S. Appl. No. 08/039,155, now U.S. Pat. No. 5,366,567, filed Apr. 7, 1993, Ogino, Takao, Method for Chromating Treatment of Zinc Coated Steel.

U.S. Appl. No. 07/980,810, now U.S. Pat. No. 5,399,209, filed Mar. 1, 1993, Ogino, Takao, Composition and Method for Chromating Treatment of Metal.

U.S. Appl. No. 07/965,643, now U.S. Pat. No. 5,667,843, filed Oct. 23, 1992, Ogino, Takao, Pre–Treating Zinciferous Surfaces Before Conventional Chromating to Improve Rust Resistance.

U.S. Appl. No. 07/824,409, now U.S. Pat. No. 5,308,709, filed Jan. 23, 1992, Ogino, Takao, Process for Forming Composite Film on Aluminum or Aluminum Alloy Article Surface and Resulting Product.

U.S. Appl. No. 07/770,022, now U.S. Pat. No. 5,230,750, filed Oct. 2, 1991, Ogino, Takao, Chromating Method of Zinc–Based Plated Steel Sheet.

U.S. Appl. No. 07/669,940, now U.S. Pat. No. 5,108,855, filed Mar. 15, 1991, Ogino, Takao, Secondary Battery.

U.S. Appl. No. 07/512,446, now U.S. Pat. No. 5,013,620, filed Apr. 23, 1990, Ogino, Takao, Nonaqueous Electrolyte Secondary Cell.

U.S. Appl. No. 07/505,337, now U.S. Pat. No. 5,141,575, filed Apr. 5, 1990, Ogino, Takao, Surface Treatment for Zinciferous Surfaces.

U.S. Appl. No. 07/444,664, now U.S. Pat. No. 4,959,277, filed Dec. 1, 1989, Ogino, Takao, Process for Treating Plated Steel Sheet.

U.S. Appl. No. 07/330,268, now U.S. Pat. No. 4,956,247, filed Mar. 29, 1989, Ogino, Takao, Nonaqueous Electrolyte Secondary Cell.

U.S. Appl. No. 07/274,901, now U.S. Pat. No. 4,933,506, filed Nov. 22, 1988, Ogino, Takao, Process for the Production of Dihydric Phenols.

U.S. Appl. No. 07/257,323, now U.S. Pat. No. 4,863,817, filed Oct. 13, 1988, Ogino, Takao, Nonaqueous Electrolyte Cell.

U.S. Appl. No. 07/192,932, now U.S. Pat. No. 4,865,932, filed May 12, 1988, Ogino, Takao, Electric Cells and Process for Making the Same.

U.S. Appl. No. 07/132,432, filed Dec. 14, 1987, Ogino, Takao, Method of Painting for Corrosion Prevention.

U.S. Appl. No. 07/132,244, filed Dec. 14, 1987, Ogino, Takao, Method for Hydrophilic Treatment of Aluminum Using a Cross–Linked Amide Polymer.

U.S. Appl. No. 07/132,243, now U.S. Pat. No. 4,783,224, filed Dec. 14, 1987, Ogino, Takao, Method for Hydrophilic Treatment of Aluminum Using an Amphoteric Polymer.

U.S. Appl. No. 07/048,119, now U.S. Pat. No. 4,726,886, filed May 11, 1987, Ogino, Takao, Aluminum Heat Exchanger Coating.

U.S. Appl. No. 06/937,778, now U.S. Pat. No. 4,765,386, filed Dec. 4, 1986, Ogino, Takao, Passenger Car Radial Tire Having Excellent Motion Performances and Durability.

U.S. Appl. No. 06/857,068, now U.S. Pat. No. 4,830,101, filed Apr. 29, 1986, Ogino, Takao, Aluminum Heat Exchanger and Method for Producing Aluminum Heat Exchanger.

U.S. Appl. No. 06/765,480, now U.S. Pat. No. 4,653,259, filed Aug. 14, 1985, Ogino, Takao, Reinforcement for Rubber and Method of Making Same.

U.S. Appl. No. 06/758,124, filed Jul. 23, 1985, Ogino, Takao, Release Agent Applicator.

U.S. Appl. No. 06/721,812, now U.S. Pat. No. 4,650,525, filed Apr. 5, 1985, Ogino, Takao, Surface Treatment of Aluminum and its Alloys.

U.S. Appl. No. 06/666,935, now U.S. Pat. No. 4,628,977, filed Oct. 31, 1984, Ogino, Takao, High–Durable Pneumatic Radial Tires.

U.S. Appl. No. 06/610,748, now U.S. Pat. No. 4,580,521, filed May 16, 1984, Ogino, Takao, Release Agent Applicator for Use With Copying Machine.

U.S. Appl. No. 06/610,747, now U.S. Pat. No. 4,573,428, filed May 16, 1984, Ogino, Takao, Release Agent Applicator for Use With Copying Machine.

U.S. Appl. No. 06/610,649, filed May 16, 1984, Ogino, Takao, Release Agent Applicator for Use With Copying Machine.

U.S. Appl. No. 06/561,508, now U.S. Pat. No. 4,572,264, filed Dec. 15, 1983, Ogino, Takao, Pneumatic Radial Tires.

U.S. Appl. No. 06/549,533, now U.S. Pat. No. 4,520,857, filed Nov. 8, 1983, Ogino, Takao, High–Durable Pneumatic Radial Tires.

U.S. Appl. No. 06/361,315, filed Mar. 24, 1982, Ogino, Takao, Pneumatic Tires.

U.S. Appl. No. 06/272,765, now U.S. Pat. No. 4,368,776, filed Jun. 11, 1981, Ogino, Takao, Aluminum Heat Exchanger.

U.S. Appl. No. 06/258,170, filed Apr. 27, 1981, Ogino, Takao, Process for Forming a Protective Film on Metal Surfaces.

U.S. Appl. No. 06/115,276, now U.S. Pat. No. 4,272,351, filed Jan. 25, 1980, Ogino, Takao, Apparatus for Electrolytic Etching.

U.S. Appl. No. 06/064,277, now U.S. Pat. No. 4,230,758, filed Aug. 6, 1979, Ogino, Takao, Fluorine Resin Coated Structure of Aluminum or Aluminum Alloy.

* cited by examiner

NON-AQUEOUS ELECTROLYTE
SECONDARY CELL AND, DETERIORATION-
PREVENTING AGENT FOR NON-AQUEOUS
ELECTROLYTE SECONDARY CELL AND
ADDITIVE FOR NON-AQUEOUS
ELECTROLYTE SECONDARY CELL FOR
USE THEREIN

TECHNICAL FIELD

The present invention relates to a non-aqueous electrolyte secondary cell having excellent resistance to deterioration, excellent self-extinguishability and excellent incombustibility, an additive for a non-aqueous electrolyte for use therein, and a deterioration inhibitor for a non-aqueous electrolyte secondary cell which can effectively inhibit deterioration of the non-aqueous electrolyte secondary cell.

BACKGROUND ART

In the prior art, nickel-cadmium cells have been mainly used as secondary cells, especially for memory backup for audiovisual and information devices such as personal computers and VTRs, and for power sources for operating them. Recently, great attention has been paid to the use of non-aqueous electrolyte secondary cells, which have the advantages of high voltage and high energy density and exhibit excellent self-dischargability, as substitutes for the nickel-cadmium cells. Various attempts have been carried out to develop the non-aqueous electrolyte secondary cells, and some non-aqueous electrolyte secondary cells are available on the market. For example, majority of notebook-sized personal computers, cellular phones, and the like is operated by such non-aqueous electrolyte secondary cells.

In these non-aqueous electrolyte secondary cells, carbon (hard carbon or soft carbon) is often used as a material for forming negative electrodes, and various types of organic solvents are used as electrolytes in order to reduce risk caused at the time of forming lithium on the negative electrodes, and to increase the operating voltage.

Further, in non-aqueous electrolyte secondary cells for cameras, alkali metals (especially lithium metal and lithium alloys) and the like are used as the material for the negative electrodes, and aprotic organic solvents such as ester-containing organic solvents are generally used as the electrolytes in view of reducing risk, which is caused when the alkali metals greatly react with water.

Although the performance of non-aqueous electrolyte secondary cells of these types is high, a problem arises in that the high performance cannot be maintained for a long time since the cells easily deteriorate. Thus, there has been a strong demand for the development of a technique which can inhibit deterioration of the non-aqueous electrolyte secondary cells and keep various properties of the non-aqueous electrolyte secondary cells high for a long time.

Further, the non-aqueous electrolyte secondary cells have the following safety problems. One problem is that the alkali metals (especially lithium metal and lithium alloys) used as the material for the negative electrodes in the non-aqueous electrolyte secondary cells are highly reactive with water, and therefore, when water enters the cells which are not completely sealed, there is a high risk of the negative electrode material in the cells reacting with water to generate hydrogen or catch fire. Another problem is that the melting point of the lithium metals is low (about 170° C.), and therefore, when a large electric current flows abruptly when a short-circuit occurs, very dangerous situations, such as the cells becoming abnormally exothermic and melting, are caused. Still another problem is that, as the cells generate heat, the electrolyte containing as a main component the above-mentioned organic solvent vaporizes and decomposes to generate gas, and the cells burst and catch fire due to the generated gas.

In order to solve these problems, for example, a technique for providing a safety mechanism in cylindrical cells has been proposed (Nikkan Kogyo Shimbun, Ltd., Electronic Technology, Vol. 39, No. 9, 1997), in which the safety mechanism is designed as follows. When the temperature of a cylindrical cell rises when there is a short-circuit or an overcharge and the inner pressure thereof is thereby increased, a safety valve starts to operate and, at the same time, electrode terminals are ruptured to thereby prevent excess current in a predetermined amount or more from running through the cell.

However, the safety mechanism does not always work correctly or, that is, the safety mechanism is not always reliable. When the safety mechanism does not work correctly, excess current may flow through the cell, thereby overheating the cell and causing dangerous situations such as ignition of the cell. Therefore, the safety mechanism proposed is still problematic.

In order to solve the above problem, in place of safety measures taken by providing accessory parts such as the aforementioned safety valve, there is a demand for development of a non-aqueous electrolyte secondary cell essentially having high safety.

A first object of the present invention is to provide a non-aqueous electrolyte secondary cell which has excellent resistance to deterioration, in which the interface resistance of the non-aqueous electrolyte is low, and which has excellent discharge properties at low temperatures, while maintaining characteristics and the like required for a cell.

A second object of the present invention is to provide a non-aqueous electrolyte secondary cell which has excellent self-extinguishability or incombustibility, in which the interface resistance of the non-aqueous electrolyte is low, and which has excellent discharge properties at low temperatures, while maintaining characteristics and the like required for a cell.

A third object of the present invention is to provide a deterioration inhibitor for a non-aqueous electrolyte secondary cell which, by being added into the non-aqueous electrolyte in the non-aqueous electrolyte secondary cell, can prevent deterioration of the non-aqueous electrolyte, can lower the interface resistance of the non-aqueous electrolyte, and which can give excellent discharge properties at low temperatures, while maintaining characteristics required for a cell, such as charge and discharge capacity.

A fourth object of the present invention is to provide an additive for a non-aqueous electrolyte secondary cell which, by being added into the non-aqueous electrolyte in the non-aqueous electrolyte secondary cell, can give self-distinguishability or incombustibility and excellent discharge properties at low temperatures to the non-aqueous electrolyte, and which can lower the interface resistance of the non-aqueous electrolyte, while maintaining characteristics and the like required for a cell.

DISCLOSURE OF THE INVENTION

A first aspect of the non-aqueous electrolyte secondary cell of the present invention to accomplish the first object has a positive electrode, a negative electrode, and a nonaqueous electrolyte including at least 2% by volume and less than 20% by volume of a phosphazene derivative, and a supporting salt.

A second aspect of the non-aqueous electrolyte secondary cell of the present invention to accomplish the second object has a positive electrode, a negative electrode, and a non-aqueous electrolyte including at least 20% by volume of a phosphazene derivative, and a supporting salt.

The deterioration inhibitor for a non-aqueous electrolyte secondary cell of the present invention to accomplish the third object is added to a non-aqueous electrolyte in the non-aqueous electrolyte secondary cell which contains the non-aqueous electrolyte including a supporting salt and an organic solvent, and the deterioration inhibitor includes at least a phosphazene derivative.

The additive for a non-aqueous electrolyte secondary cell of the present invention to accomplish the fourth object is added to a non-aqueous electrolyte in the non-aqueous electrolyte secondary cell which contains the non-aqueous electrolyte including a supporting salt and an organic solvent, and the additive includes at least a phosphazene derivative.

BEST MODE FOR CARRYING OUT THE INVENTION

A non-aqueous electrolyte secondary cell of the present invention has a positive electrode, a negative electrode, a non-aqueous electrolyte, and, if necessary, other members.

A deterioration inhibitor for a non-aqueous electrolyte secondary cell and an additive for a non-aqueous electrolyte secondary cell of the present invention contain a phosphazene derivative and, if necessary, other components, and are added to a non-aqueous electrolyte in a known non-aqueous electrolyte secondary cell.

[Positive Electrode]

Materials for the positive electrode are not particularly limited, and can be appropriately selected from known positive electrode materials. Preferred examples include metal oxides such as $V_2O_5$, $V_6O_{13}$, $MnO_2$, $MoO_3$, $LiCoO_3$, $LiNiO_2$, and $LiMn_2O_4$, metal sulfides such as $TiS_2$ and $MoS_2$, and electrically conductive polymers such as polyaniline. Among these, $LiCoO_2$, $LiNiO_2$, and $LiMn_2O_4$ are particularly preferable because they are safe and have high capacity and excellent wettability in electrolytes. These materials may be used alone, or a combination of two or more may be used.

The shape of the positive electrode is not particularly limited and can be selected from shapes known for electrodes. Examples include a sheet, a column, a plate, a spiral, and the like.

[Negative Electrode]

Materials for the negative electrode are not particularly limited as long as they have the ability to absorb and release lithium or lithium ions and the like, and can be appropriately selected from known negative electrode materials. Preferred examples include lithium-containing materials, specifically, lithium metal itself, lithium alloys combined with aluminum, indium, lead, or zinc, and carbon materials such as lithium-doped graphite. These materials may be used alone, or a combination of two or more may be used.

The shape of the negative electrode is not particularly limited and can be appropriately selected from known shapes similar to the shapes of the positive electrode.

[Non-Aqueous Electrolyte]

The non-aqueous electrolyte contains a supporting salt, a phosphazene derivative, and, if necessary, other components such as an aprotic organic solvent and the like.

The non-aqueous electrolyte, to which the deterioration inhibitor for a non-aqueous electrolyte secondary cell and the additive for a non-aqueous electrolyte secondary cell are added, contains the supporting salt and the organic solvent.

Supporting Salt

Preferred examples of the supporting salt are supporting salts and the like which serve as an ion source of lithium ions.

Although the supporting salts serving as the ion source of the lithium ions are not particularly limited, preferred examples thereof include lithium salts such as $LiClO_4$, $LiBF_4$, $LiPF_6$, $LiCF_3SO_3$, $LiAsF_6$, $LiC_4F_9SO_3$, $Li(CF_3SO_2)_2N$, $Li(C_2F_5SO_2)_2N$, and the like. These lithium salts may be used alone, or a combination of two or more may be used.

The amount of the supporting salt in the non-aqueous electrolyte is preferably 0.2 to 1 mole, and more preferably 0.5 to 1 mole per kg of the non-aqueous electrolyte (solvent component).

When the amount is less than 0.2 moles, sufficient electric conductivity of the non-aqueous electrolyte may not be ensured, thereby affecting the charge and discharge properties of the cell. When the amount exceeds 1 mole, the viscosity of the non-aqueous electrolyte increases, and sufficient mobility of the lithium ions and the like cannot be ensured. As a result, sufficient electric conductivity of the non-aqueous electrolyte may not be ensured, thereby affecting the charge and discharge properties of the cell.

Phosphazene Derivative (Compound)

In the first aspect of the non-aqueous electrolyte secondary cell, the reason why the non-aqueous electrolyte contains the phosphazene derivative (compound), and the reason why the deterioration inhibitor for a non-aqueous electrolyte secondary cell, which deterioration inhibitor contains the phosphazene derivative (compound), is added to the non-aqueous electrolyte are as follows.

In an electrolyte such as an ester-containing electrolyte used in a conventional non-aqueous electrolyte secondary cell, for example, a lithium ion source and the like such as $LiPF_6$ salt, which is a supporting salt, decomposes into LiF and $PF_5$ with time. The generated $PF_5$ gas further reacts with water and the like, and then hydrogen fluoride gas is generated. These $PF_5$ gas and hydrogen fluoride gas corrode an electrode and cause it to deteriorate. Namely, not only the electric conductivity of the non-aqueous electrolyte decreases, but also the hydrogen fluoride gas causes the electrode materials to deteriorate. On the other hand, the phosphazene derivative, for example, suppresses the decomposition of the lithium ion source such as $LiPF_6$ and the like so as to contribute to stabilization of the cell. Therefore, by incorporating the phosphazene derivative in the conventional non-aqueous electrolyte, it becomes possible to suppress the decomposition of the non-aqueous electrolyte and suppress the corrosion and deterioration of the electrode.

In the second aspect of the non-aqueous electrolyte secondary cell, the reason why the non-aqueous electrolyte contains the phosphazene derivative (compound), and the reason why the additive for a non-aqueous electrolyte secondary cell, which additive contains the phosphazene derivative (compound), is added to the non-aqueous electrolyte are as follows.

Conventionally, in a non-aqueous electrolyte having as a main component an aprotic organic solvent used in a non-aqueous electrolyte secondary cell, when a short-circuit occurs, a large electric current flows abruptly, the cell becomes abnormally exothermic, the electrolyte may vaporize or decompose, gas may be generated, and the cell may burst or catch fire due to the generated gas or heat.

Therefore, such a secondary cell has high risk. However, when a phosphazene derivative is added to these conventional non-aqueous electrolytes, it becomes possible to reduce such risks since excellent self-extinguishability or incombustibility is made to manifest in the non-aqueous electrolyte by the action of nitrogen gas, halogen gas and the like derived from the phosphazene derivative. Further, it becomes possible to reduce such risks since phosphorous acts to suppress the chain decomposition of polymer materials forming the cell, and thus can effectively give self-extinguishability or incombustibility to the cell.

In the first aspect of the non-aqueous electrolyte secondary cell, the amount of the phosphazene derivative in the non-aqueous electrolyte must 2% by volume or more to less than 20% by volume. The amount thereof is preferably 2.5% by volume or more to less than 20% by volume, and more preferably 3% by volume or more to less than 20% by volume. When the amount falls within the above numerical value range, deterioration of the non-aqueous electrolyte secondary cell can be appropriately suppressed.

Deterioration refers to decomposition of the supporting salt (e.g., lithium salt). The effect of preventing the deterioration can be evaluated by the following "Stability Evaluation Method".

Stability Evaluation Method (1) First, a non-aqueous electrolyte containing a supporting salt is prepared, and its moisture percentage is measured. Next, the concentration of hydrogen fluoride in the non-aqueous electrolyte is measured by NMR or GC-MS. Further, color tone of the non-aqueous electrolyte is visually observed, and the charge and discharge capacity thereof is measured by a charge and discharge test.

(2) The non-aqueous electrolyte is left for two months in a glovebox, and then the moisture percentage of the non-aqueous electrolyte and the concentration of hydrogen fluoride are again measured, the color tone of the non-aqueous electrolyte is observed, and the charge and discharge capacity is measured. The stability is evaluated in accordance with the changes in the obtained values.

In the second aspect of the non-aqueous electrolyte secondary cell, the amount of the phosphazene derivative in the non-aqueous electrolyte must be 20% by volume or more, and preferably 30% by volume or more. An upper limit of the amount of the phosphazene derivative is not especially limited. The amount of the phosphazene derivative in the non-aqueous electrolyte may be 100% by volume.

When the amount is less than 20% by volume, the non-aqueous electrolyte cannot exhibit sufficient self-extinguishability. On the other hand, the amount of 30% by volume or more is preferable since the non-aqueous electrolyte can exhibit sufficient incombustibility.

"Self-extinguishability" refers, in the "Self-Extinguishability Evaluation Method" described below, to a property in which an ignited flame is extinguished at a 25 mm to 100 mm line and which achieves a state in which even falling objects cannot catch flame. "Incombustibility" refers, in the "Incombustibility Evaluation Method" described below, to a property in which an ignited flame does not reach a 25 mm line and which achieves a state in which even falling objects cannot catch flame.

Evaluation Method for Self-Extinguishability or Incombustibility

Evaluation of self-extinguishability and incombustibility is conducted by measuring and evaluating the burning action of an ignited flame in an atmospheric environment, using a method in which a UL94HB testing method of UL (Underwriting Laboratory) standards has been arranged. Ignitability, combustibility, generation of carbides, and the phenomenon of second ignition are observed. Specifically, in conformity with UL94HB testing method criteria, specimens of 127 mm×12.7 mm are prepared by soaking non-combustible quartz fiber with 1 ml of respective electrolytes and tested.

An added amount of the deterioration inhibitor for a non-aqueous electrolyte secondary cell to the non-aqueous electrolyte in the non-aqueous electrolyte secondary cell is preferably 2 to 90% by volume, more preferably more than 2.5% by volume to 90% by volume or less, and particularly preferably 3 to 75% by volume.

When the added amount is less than 2% by volume, the effect of preventing deterioration may not be sufficiently exhibited. When the added amount exceeds 90% by volume, the viscosity of the non-aqueous electrolyte becomes higher, and excellent electric conductivity may not be ensured.

Deterioration refers to decomposition of the supporting salt (e.g., lithium salt). The effect of preventing the deterioration can be evaluated by the following "Stability Evaluation Method".

Stability Evaluation Method (1) First, a non-aqueous electrolyte containing a lithium salt (supporting salt) is prepared, and its moisture percentage is measured. Next, the concentration of hydrogen fluoride in the non-aqueous electrolyte is measured by NMR or GC-MS. Further, color tone of the non-aqueous electrolyte is visually observed, and the charge and discharge capacity thereof is measured by a charge and discharge test.

(2) The non-aqueous electrolyte is left for two months in a glovebox, and then the moisture percentage of the non-aqueous electrolyte and the concentration of hydrogen fluoride are again measured, the color tone of the non-aqueous electrolyte is observed, and the charge and discharge capacity is measured. The stability is evaluated in accordance with the changes in the obtained values.

Examples of the added amount of the additive for a non-aqueous electrolyte secondary cell in the non-aqueous electrolyte appropriately include two amounts based on the effects obtained by adding the non-aqueous electrolyte secondary cell to the non-aqueous electrolyte secondary cell: a first added amount which provides the non-aqueous electrolyte with self-extinguishability and a second added amount which provides the non-aqueous electrolyte with incombustibility.

The first added amount is preferably 20 to 90% by volume, and more preferably 40 to 75% by volume. When the phosphazene derivative has a substituent including halogen in the molecular structure thereof, a range of 10 to 90% by volume is preferable, and a range of 20 to 75% by volume is more preferable.

When the added amount is less than 20% by volume, the self-extinguishability may not be sufficiently given to the non-aqueous electrolyte. When the added amount exceeds 90% by volume, the viscosity of the non-aqueous electrolyte becomes higher, and the electric conductivity may extremely decrease.

However, in the non-aqueous electrolyte, when the supporting salt includes $LiPF_6$ and the organic solvent includes ethylene carbonate, the first added amount is preferably 1.5 to 2.5% by volume.

"Self-extinguishability" refers, in the "Self-Extinguishability Evaluation Method" described below, to a property in which an ignited flame is extinguished at a 25 mm to 100 mm line and which achieves a state in which even falling objects cannot catch flame.

The second added amount is preferably 30 to 90% by volume, and more preferably 40 to 60% by volume. When the phosphazene derivative has a substituent including halogen in the molecular structure thereof, the second added amount is preferably 20 to 90% by volume, and more preferably 30 to 60% by volume.

When the added amount is less than 30% by volume, incombustibility may not be sufficiently given to the non-aqueous electrolyte. On the other hand, when the added amount exceeds 90% by volume, the viscosity of the non-aqueous electrolyte becomes higher, and good electrical conductivity may not be maintained.

However, in the non-aqueous electrolyte, when the supporting salt includes $LiPF_6$ and the organic solvent includes ethylene carbonate, the second added amount is preferably more than 2.5% by volume to 90% by volume or less, and more preferably 3% by volume or more to 90% by volume or less.

"Incombustibility" refers, in the "Incombustibility Evaluation Method" described below, to a property in which an ignited flame does not reach a 25 mm line and which achieves a state in which even falling objects cannot catch flame.

Evaluation of self-extinguishability and incombustibility is conducted by measuring and evaluating the burning action of an ignited flame in an atmospheric environment, using the method in which the UL94HB testing method of UL (Underwriting Laboratory) standards has been arranged. Ignitability, combustibility, generation of carbides, and the phenomenon of second ignition are observed. Specifically, in conformity with the UL94HB testing method criteria, specimens of 127 mm×12.7 mm are prepared by soaking noncombustible quartz fiber with 1 ml of respective electrolytes and tested.

When the non-aqueous electrolyte includes the phosphazene derivative, $LiPF_6$, and ethylene carbonate, or the phosphazene derivative, $LiPF_6$, and propylene carbonate, the non-aqueous electrolyte can exhibit the effect of excellent self-extinguishability or incombustibility even when the amount of the phosphazene derivative in the non-aqueous electrolyte is small in spite of the above description. Namely, in such a case, the amount of the phosphazene derivative in the non-aqueous electrolyte is preferably 1.5 to 2.5% by volume in order to develop self-extinguishability of the non-aqueous electrolyte. Further, the amount of more than 2.5% by volume is preferable to develop the incombustibility of the non-aqueous electrolyte.

In the second aspect of the non-aqueous electrolyte secondary cell and the additive for a non-aqueous electrolyte secondary cell of the present invention, the phosphazene derivative preferably has a substituent including halogen in the molecular structure thereof.

When the phosphazene derivative has a substituent including halogen in the molecular structure thereof, even for an amount less than that within the numerical value range of the phosphazene derivative, it becomes possible for the non-aqueous electrolyte to effectively exhibit self-extinguishability or incombustibility by halogen gas derived from the phosphazene derivative.

Further, in a compound in which halogen is included in the substituent, a problem may exist in generation of halogen radicals. However, in the phosphazene derivative of the present invention, because the phosphorus element in the molecular structure captures a halogen radical to form a stable phosphorus halide, such a problem does not arise.

The amount of halogen in the phosphazene derivative is preferably 2 to 80% by weight, more preferably 2 to 60% by weight, and most preferably 2 to 50% by weight.

When the amount is less than 2% by weight, it may not be possible to obtain significant halogen addition effect. When the amount exceeds 80% by weight, the viscosity of the non-aqueous electrolyte becomes higher, and the electric conductivity may decrease when the phosphazene derivative is added to the non-aqueous electrolyte.

Examples of halogen appropriately include fluorine, chlorine, bromine, and the like.

The phosphazene derivative is not especially limited as long as it is a liquid at room temperature (25° C.). A preferred example of the phosphazene derivative is, for example, a chain phosphazene derivative represented by the following general formula (1), or a cyclic phosphazene derivative represented by the following general formula (2).

General Formula (1)

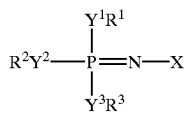

wherein $R^1$, $R^2$, and $R^3$ represent monovalent substituents or halogen. X represents a group which includes at least one element selected from a group of carbon, silicon, germanium, tin, nitrogen, phosphorus, arsenic, antimony, bismuth, oxygen, sulfur, selenium, tellurium, and polonium. $Y^1$, $Y^2$, and $Y^3$ represent bivalent connecting groups, bivalent elements, or single bonds.

General Formula (2)

wherein $R^4$ represents a monovalent substituent or halogen. n represents a number of 3 to 15.

In general formula (1), $R^1$, $R^2$, and $R^3$ are not especially limited as long as they are monovalent substituents or halogen, and can be appropriately selected according to the purpose.

Examples of the monovalent substituent include alkoxy group, alkyl group, carboxyl group, acyl group, aryl group, and the like.

Examples of halogen appropriately include, for example, the above-mentioned halogen.

Among them, alkoxy group is particularly preferable from the standpoint of making the viscosity of the non-aqueous electrolyte low. $R^1$ to $R^3$ may be the same substituents with each other, or some of them may be different substituents.

Examples of the alkoxy group include alkoxy group such as methoxy group, ethoxy group, propoxy group, and butoxy group, alkoxy substituted alkoxy group such as methoxyethoxy group, methoxyethoxyethoxy group, and the like. Among them, all of $R^1$ to $R^1$ are preferably methoxy group, ethoxy group, methoxyethoxy group or methoxyethoxyethoxy group, and more preferably methoxy group or ethoxy group in view of low viscosity and high dielectric constant.

Examples of the alkyl group include methyl group, ethyl group, propyl group, butyl group, pentyl group, and the like.

Examples of the acyl group include formyl group, acetyl group, propionyl group, butyryl group, isobutyryl group, valeryl group, and the like.

Examples of the aryl group include phenyl group, tolyl group, naphthyl group, and the like.

As described above, hydrogen elements in these substituents are preferably substituted by halogen.

In general formula (1), examples of groups represented by $Y^1$, $Y^2$, and $Y^3$ include, in addition to $CH_2$ group, groups including oxygen, sulfur, selenium, nitrogen, boron, aluminum, scandium, gallium, yttrium, indium, lanthanum, thallium, carbon, silicon, titanium, tin, germanium, zirconium, lead, phosphorus, vanadium, arsenic, niobium, antimony, tantalum, bismuth, chromium, molybdenum, tellurium, polonium, tungsten, iron, cobalt, nickel, or the like. Among them, the $CH_2$ group and groups including oxygen, sulfur, selenium, or nitrogen are preferable, and aryl groups including sulfur or selenium are more preferable. In the second aspect of the non-aqueous electrolyte secondary cell and the additive for a non-aqueous electrolyte secondary cell of the present invention, it is preferable that $Y^1$, $Y^2$, and $Y^3$ include sulfur or selenium, in view of remarkably improving the incombustibility of the non-aqueous electrolyte. $Y^1$ to $Y^3$ may be the same or different from each other.

In general formula (1), X is preferably a group including at least one kind of element selected from a group of carbon, silicon, nitrogen, phosphorus, oxygen, and sulfur, in view of potential harm and environmental considerations. Preferably, X is a group having one of structures represented by the following general formula (3).

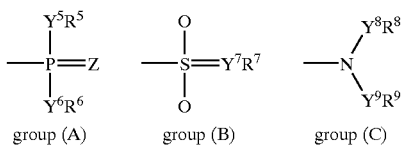

wherein $R^1$ to $R^9$ represent monovalent substituents or halogen. $Y^5$ to $Y^9$ represent bivalent connecting groups, bivalent elements, or single bonds. Z represents a bivalent group or a bivalent element.

In general formula (3), preferred examples of $R^1$ to $R^9$ include the same monovalent substituents or halogen as in $R^1$ to $R^3$ in general formula (1). $R^5$ to $R^9$ may be the same or different from each other within the same group. $R^1$ and $R^6$, and $R^8$ and $R^9$ may bond with each other to form a ring.

Examples of groups represented by $Y^5$ to $Y^9$ in general formula (3) include the same bivalent connecting group or the same bivalent groups as in $Y^1$ to $Y^3$ in general formula (1). In the second aspect of the non-aqueous electrolyte secondary cell and the additive for a non-aqueous electrolyte secondary cell of the present invention, as described above, groups including sulfur and selenium are especially preferable in view of remarkably improving the incombustibility of the non-aqueous electrolyte. These groups may be the same or different from each other within the same organic group.

In general formula (3), examples of Z include, in addition to $CH_2$ group, CHR (hereinafter, R represents alkyl group, alkoxyl group, phenyl group, or the like) group, and NR group, groups including oxygen, sulfur, selenium, boron, aluminum, scandium, gallium, yttrium, indium, lanthanum, thallium, carbon, silicon, titanium, tin, germanium, zirconium, lead, phosphorus, vanadium, arsenic, niobium, antimony, tantalum, bismuth, chromium, molybdenum, tellurium, polonium, tungsten, iron, cobalt, nickel, or the like. Among them, in addition to the $CH_2$ group, the CHR group, and the NR group, groups including oxygen, sulfur, or selenium are preferable. In the second aspect of the non-aqueous electrolyte secondary cell and the additive for a non-aqueous electrolyte secondary cell, in view of remarkably improving the incombustibility of the non-aqueous electrolyte, groups including sulfur or selenium are preferable.

In general formula (3), a group including phosphorous such as group (A) is especially preferable in view of effectively providing resistance to deterioration, self-extinguishability, or incombustibility. A group including sulfur such as group (B) is especially preferable in view of ensuring low interface resistance of the non-aqueous electrolyte.

In general formula (2), $R^4$ is not particularly limited provided that it is a monovalent substituent or halogen, and can be appropriately selected according to the purpose.

Examples of the monovalent substituent include alkoxy groups, alkyl groups, carboxyl groups, acyl groups, aryl groups, and the like.

Examples of the halogen appropriately include the above-mentioned halogen. Among them, in view of making the viscosity of the non-aqueous electrolyte low, alkoxy groups are preferable.

Examples of the alkoxy group include methoxy group, ethoxy group, methoxyethoxy group, propoxy group, phenoxy group, and the like. Among them, methoxy group, ethoxy group, and methoxyethoxy group are especialy preferable.

As described above, hydrogen elements in these substituents are preferably substituted by halogen.

The non-aqueous electrolyte secondary cell which has a more appropriate viscosity, solubility suitable for mixing, and the like, the deterioration inhibitor for a non-aqueous electrolyte secondary cell, and the additive for a non-aqueous electrolyte secondary cell can be prepared by appropriately selecting $R^1$ to $R^9$, $Y^1$ to $Y^3$, $Y^5$ to $Y^9$, and Z in general formulae (1) to (3). These phosphazene derivatives may be used alone or in combination of two or more kinds.

A flash point of the phosphazene derivative is not particularly limited. In view of suppressing ignition, the flash point of the phosphazene derivative is preferably 100° C. or more, and more preferably 150° C. or more.

By adding the deterioration inhibitor for a non-aqueous electrolyte secondary cell, which includes at least the phosphazene derivative, to the non-aqueous electrolyte in a known non-aqueous electrolyte secondary cell, it becomes possible to easily manufacture a non-aqueous electrolyte secondary cell in which deterioration of the non-aqueous electrolyte is appropriately prevented, the interface resistance of the non-aqueous electrolyte can be lowered, the non-aqueous electrolyte can be provided with excellent discharge properties at low temperatures, high stability is maintained over a long period of time, and which has properties equally as excellent as those of ordinary cells.

By adding the additive for a non-aqueous electrolyte secondary cell, which includes at least the phosphazene derivative, to the non-aqueous electrolyte in a known non-aqueous electrolyte secondary cell, it becomes possible to easily manufacture a non-aqueous electrolyte secondary cell in which the non-aqueous electrolyte can be provided with excellent self-extinguishability or incombustibility and excellent discharge properties at low temperatures, the interface resistance of the non-aqueous electrolyte can be lowered, safety is high, and which has properties equally as excellent as those of ordinary cells.

Organic Solvent

The aprotic organic solvent is especially preferable as the organic solvent in view of safety.

When the non-aqueous electrolyte contains an aprotic organic solvent, high safety can be obtained without reacting with materials of the negative electrode. Moreover, the viscosity of the non-aqueous electrolyte can be made low, and ion conductivity optimum for the non-aqueous electrolyte secondary cell can be easily accomplished.

Although the aprotic organic solvent is not particularly limited, in view of making the viscosity of the non-aqueous electrolyte low, preferred examples include ether compounds, ester compounds, and the like. Specific examples appropriately include 1,2-dimethoxyethane, tetrahydrofuran, dimethyl carbonate, diethyl carbonate, diphenyl carbonate, ethylene carbonate, propylene carbonate, γ-butyrolactone, γ-valerolactone, methyl ethyl carbonate, and the like.

Among them, a cyclic ester compound such as ethylene carbonate, propylene carbonate, γ-butyrolactone, and the like, a chain ester compound such as 1,2-dimethoxyethane, dimethyl carbonate, ethyl methyl carbonate, and diethyl carbonate, and the like are preferable. The cyclic ester compound is preferable in view of having a high relative dielectric constant and excellent solubility with regard to lithium salt or the like. The chain ester compound is preferable in view of having a low viscosity and lowering the viscosity of the non-aqueous electrolyte. Although these compounds may be used alone, a combination of two or more is preferably used.

Although the viscosity of the aprotic organic solvent at 25° C. is not particularly limited, the viscosity is preferably equal to or less than 10 mPa·s (10 cP).

[Other Members]

Other members include a separator, which is disposed between a positive electrode and a negative electrode of the non-aqueous electrolyte secondary cell in order to prevent a short-circuit or the like caused by the positive and negative electrodes contacting each other.

Preferred examples of materials for the separator include materials which can reliably prevent contact of the electrodes and can make the electrolyte pass therethrough or include the electrolyte therein, such as a nonwoven fabric, a thin film, and the like made of a synthetic resin such as polytetrafluoroethylene, polypropylene, polyethylene, and the like. Among them, a microporous film having a thickness of about 20 to 50 μm and made of polypropylene or polyethylene is particularly preferable.

Preferred examples of other members include, in addition to the separator, known members which are usually used for a cell.

A shape of the above-described non-aqueous electrolyte secondary cell is not particularly limited, and preferred examples thereof include various known shapes such as a coin shape, a button shape, a paper shape, an angled shape, or a cylindrical shape having a spiral structure.

When the non-aqueous electrolyte secondary cell has the spiral structure, the non-aqueous electrolyte secondary cell can be manufactured by, for example, manufacturing a sheet-shaped positive electrode, superposing a (sheet-shaped) negative electrode on the positive electrode with a collector being interposed therebetween, and winding up the formed structure.

As described above, the first aspect of the non-aqueous electrolyte secondary cell has excellent resistance to deterioration, and the second aspect of the non-aqueous electrolyte secondary cell has excellent self-extinguishability or incombustibility. The non-aqueous electrolyte secondary cells of both the aspects maintain characteristics required for a cell and have excellent discharge properties at low temperatures, and the non-aqueous electrolytes of the cells have low interface resistance.

EXAMPLES

Examples 1 and 2 and Comparative Example 1 of the non-aqueous electrolyte secondary cell of the first aspect are described hereinafter. However, the present invention is not limited to the Examples and the Comparative Example.

Example 1

[Preparation of Non-Aqueous Electrolyte]

To 49 ml of γ-butyrolactone (aprotic organic solvent), 1 ml (2% by volume) of a phosphazene derivative (chain EO type phosphazene derivative (a compound in which, in general formula (1), X has a structure of group (A) represented by general formula (3), all of $Y^1$ to $Y^3$ and $Y^5$ to $Y^6$ are single bonds, all of $R^1$ to $R^1$ and $R^5$ to $R^6$ are ethoxy groups, and Z is oxygen)) was added. Then, $LiPF_6$ (lithium salt) was dissolved in the resultant mixture at a concentration of 0.5 moles/kg to prepare a non-aqueous electrolyte.

Evaluation of Deterioration

The moisture percentages (ppm), the concentrations of hydrogen fluoride (ppm), and charge and discharge capacities (mAh/g) of the resultant non-aqueous electrolyte immediately after preparation thereof and after being left for two months in a glovebox were measured and calculated in the same manner as the above-described "Stability Evaluation Method". At this time, the charge and discharge capacity (mAh/g) was obtained by measuring a charge and discharge curve using a positive electrode or a negative electrode of known weights, and dividing the obtained charge and discharge amounts by the weights of the electrode or negative electrode used. Results are shown in Table 1.

Color tone changes of the non-aqueous electrolyte immediately after preparation thereof and after being left for two months in the glovebox were visually observed, and no changes were detected.

[Manufacturing of Non-Aqueous Electrolyte Secondary Cell]

A cobalt oxide represented by chemical formula $LiCoO_2$ was used as a positive electrode active material. 10 parts of acetylene black (conductive assisting agent) and 10 parts of teflon binder (binder resin) were added to 100 parts of $LiCoO_2$, and the resultant mixture was kneaded with an organic solvent (mixed solvent of ethyl acetate/ethanol, 50/50% by volume). Thereafter, the resultant mixture was rolled into a thin positive electrode sheet having a thickness of 100 μm and a width of 40 mm.

Subsequently, an aluminum foil (collector) having a thickness of 25 μm, which had a surface coated with a conductive adhesive, was sandwiched between two of the positive electrode sheets thus obtained. A lithium metal foil having a thickness of 150 μm was superposed onto the resulting structure with a separator (microporous film of polypropylene) having a thickness of 25 μm being interposed therebetween. The resulting structure was wound up to manufacture a cylindrical electrode. The length of the positive electrode for the cylindrical electrode was about 260 mm.

The non-aqueous electrolyte was injected into the cylindrical electrode, and the cylindrical electrode was sealed to manufacture a AA lithium cell. Since the cell thus obtained used the non-aqueous electrolyte, the cell had excellent resistance to deterioration while maintaining properties required for a cell.

Evaluation of Discharge Properties at Low Temperatures (Measurement of Discharge Capacities at Low Temperatures)

Using the non-aqueous electrolyte secondary cell thus obtained, charge and discharge were repeated up to 50 cycles under the following conditions: an uppermost voltage of 4.5 V, a lowermost voltage of 3.0 V, a discharge current of 100 mA, and a charge current of 50 mA. At this time, charge was carried out at 20° C., and discharge was carried out at low temperatures (−20° C., −10° C.). Discharge capacity obtained at each of the low temperatures was compared with the discharge capacity obtained at 20° C., and reduction ratio of the discharge capacity was calculated in accordance with the following expression. Results are shown in Table 1.

Expression: reduction ratio of discharge capacity=100−(discharge capacity at a low temperature/discharge capacity (20° C.))×100 (%)

Example 2

A non-aqueous electrolyte was prepared in the same manner as in Example 1 except that, in the "Preparation of Non-Aqueous Electrolyte" in Example 1, the added amount aqueous electrolyte immediately after preparation thereof and after being left for two months in the glovebox were visually observed. It was observed that the color of the non-aqueous electrolyte had turned black after the non-aqueous electrolyte was left for two months in the glovebox.

Further, a non-aqueous electrolyte secondary cell was manufactured in the same manner as in Example 1. The resultant non-aqueous electrolyte secondary cell had poor resistance to deterioration. Results are shown in Table 1.

TABLE 1

| | Immediately after preparation of electrolyte | | | Left for two months (in glovebox) | | | Evaluation of discharge properties at low temperatures (reduction ratio of discharge capacity after 50 cycles) | | |
|---|---|---|---|---|---|---|---|---|---|
| | Charge and discharge capacity (mAh/g) | HF concentration | Moisture percentage (ppm) | Charge and discharge capacity (mAh/g) | HF concentration (ppm) | Moisture percentage (ppm) | Temperature at the time of discharge: −10° C. | Temperature at the time of discharge: −20° C. | Evaluation |
| Example 1 | 145 | 5 ppm or less | 20 | 143 | 0 | 20 | 40% or less | 70% or less | High stability, excellent resistance to deterioration |
| Example 2 | 145 | 5 ppm or less | 20 | 145 | 0 | 20 | 40% or less | 70% or less | Very high stability, extremely excellent resistance to deterioration |
| Comparative Example 1 | 145 | 5 ppm or less | 20 | 20 | 40 | 2 | 50% or more | 85% or more | Low stability, occurrence of deterioration | of the phosphazene derivative (chain EO type phosphazene derivative (a compound in which, in general formula (1), X has a structure of group (A) represented by general formula (3), all of $Y^1$ to $Y^3$ and $Y^5$ to $Y^6$ are single bonds, all of $R^1$ to $R^3$ and $R^1$ to $R^6$ are ethoxy groups, and Z is oxygen)) was changed to 20% by volume. The deterioration and the discharge properties at low temperatures of the resultant non-aqueous electrolyte were evaluated.

Color tone changes of the non-aqueous electrolyte immediately after preparation thereof and after being left for two months in the glovebox were visually observed, and no changes were detected.

Further, the first aspect of the non-aqueous electrolyte secondary cell was manufactured in the same manner as in Example 1, and the resultant non-aqueous electrolyte secondary cell had excellent resistance to deterioration. Results are shown in Table 1.

Comparative Example 1

A non-aqueous electrolyte was prepared in the same manner as in Example 1 except that, in the "Preparation of Non-Aqueous Electrolyte" in Example 1, the phosphazene derivative (chain EO type phosphazene derivative (a compound in which, in general formula (1), X has a structure of group (A) represented by general formula (3), all of $Y^1$ to $Y^3$ and $Y^5$ to $Y^6$ are single bonds, all of $R^1$ to $R^3$ and $R^5$ to $R^6$ are ethoxy groups, and Z is oxygen)) was not used, and the added amount of γ-butylolactone (aprotic organic solvent) was changed to 50 ml. The deterioration and the discharge properties at low temperatures of the resultant non-aqueous electrolyte were evaluated. Color tone changes of the non- Examples 3 to 6 and Comparative Example 2 of the non-aqueous electrolyte secondary cell of the second aspect are described hereinafter. However, the present invention is not limited to the Examples and the Comparative Example Example 3

[Preparation of Non-Aqueous Electrolyte]

To 40 ml of a mixed solvent of diethyl carbonate and ethylene carbonate (mixing ratio (volume ratio): diethyl carbonate/ethylene carbonate=1/1) (aprotic organic solvent), 10 ml (20% by volume) of a phosphazene derivative (chain EO type phosphazene derivative (a compound in which, in general formula (1), X has a structure of group (A) represented by general formula (3), all of $Y^1$ to $Y^3$ and $Y^5$ to $Y^6$ are single bonds, all of $R^1$ to $R^3$ and $R^1$ to $R^6$ are ethoxy groups, and Z is oxygen)) was added. Further, $LiBF_4$ (supporting salt) was dissolved in the resultant mixture at a concentration of 0.5 moles/kg to prepare a non-aqueous electrolyte.

Evaluation of Self-Extinguishability or Incombustibility

The resultant non-aqueous electrolyte was evaluated as shown below in the same manner as the above-described "Evaluation Method for Self-Extinguishability or Incombustibility". Results are shown in Table 2.

Evaluation of Incombustibility

An evaluation of "incombustible" was recorded when an ignited flame did not reach a 25 mm line of a device and falling objects from a net did not catch flame.

Evaluation of Self-Extinguishability

An evaluation of "self-extinguishable" was recorded when an ignited flame was extinguished at a line between 25 mm to 100 mm and falling objects from a net did not catch flame.

Evaluation of Combustibility

An evaluation of "combustible" was recorded when an ignited flame crossed a 100 mm line.

[Manufacturing of Non-Aqueous Electrolyte Secondary Cell]

A cobalt oxide represented by chemical formula $LiCoO_2$ was used as a positive electrode active material. 10 parts of acetylene black (conductive assisting agent) and 10 parts of teflon binder (binder resin) were added to 100 parts of $LiCoO_2$, and the resultant mixture was kneaded with an organic solvent (mixed solvent of ethyl acetate/ethanol, 50/50% by volume). Thereafter, the resultant mixture was rolled into a thin positive electrode sheet having a thickness of 100 μm and a width of 40 mm.

Subsequently, an aluminum foil (collector) having a thickness of 25 μm, which had a surface coated with a conductive adhesive, was sandwiched between two of the positive electrode sheets thus obtained. A lithium metal foil having a thickness of 150 μm was superposed onto the resulting structure with a separator (microporous film of polypropylene) having a thickness of 25 μm being interposed therebetween. The resulting structure was wound up to manufacture a cylindrical electrode. The length of the positive electrode for the cylindrical electrode was about 260 mm.

The non-aqueous electrolyte was injected into the cylindrical electrode, and the cylindrical electrode was sealed to manufacture a AA lithium cell.

Measurement and Evaluation of Cell Characteristics

The initial characteristics (voltage and internal resistance) of the resultant cell at 20° C. were measured and evaluated. Thereafter, charge-and-discharge cycle performance of the cell was measured and evaluated by the following evaluation method. Results are shown in Table 2.

Evaluation of Charge-and-Discharge Cycle Performance

Charge and discharge were repeated up to 50 cycles under the following conditions an uppermost voltage of 4.5 V, a lowermost voltage of 3.0 V, a discharge current of 100 mA, and a charge current of 50 mA. The charge and discharge capacity was compared with an initial charge and discharge capacity, and reduction ratio of the capacity after 50 cycles was calculated. The measurement and calculation were carried out for three cells in the same manner, and an average of the measured values for the three cells was calculated for evaluation of the charge-and-discharge cycle performance.

Evaluation of Discharge Properties at Low Temperatures (Measurement of Discharge Capacities at Low Temperatures)

Using the resultant non-aqueous electrolyte secondary cell, charge and discharge were repeated up to 50 cycles under the same conditions as in the "Evaluation of Charge-and-Discharge Cycle Performance", except that the temperatures at the time of discharge were low (−10° C., −20° C.). Discharge capacity obtained at each of the low temperatures was compared with a discharge capacity measured at 20° C., and reduction ratio of the discharge capacity was calculated in accordance with the following expression. The measurement and calculation were carried out for three cells in the same manner, and an average of the measured values for the three cells was calculated for evaluation of the discharge properties at low temperatures. Results are shown in Table 2.

Expression: reduction ratio of discharge capacity=100−(discharge capacity at a low temperature/discharge capacity (20° C.))×100 (%)

Example 4

A non-aqueous electrolyte was prepared in the same manner as in Example 3 except that, in the "Preparation of Non-Aqueous Electrolytes in Example 3, the added amount of the phosphazene derivative (chain EO type phosphazene derivative (a compound in which, in general formula (1), X has a structure of group (A) represented by general formula (3), all of $Y^1$ to $Y^3$ and $Y^5$ to $Y^6$ are single bonds, all of $R^1$ to $R^3$ and $R^5$ to $R^6$ are ethoxy groups, and Z is oxygen)) was changed to 80% by volume. The self-extinguishability or incombustibility of the resultant non-aqueous electrolyte was evaluated. Further, a non-aqueous electrolyte secondary cell was manufactured in the same manner as in Example 3. Initial cell characteristics (voltage and internal resistance), the charge-and-discharge cycle performance, and the discharge properties at low temperatures of the cell were measured and evaluated. Results are shown in Table 2.

Example 5

A non-aqueous electrolyte was prepared in the same manner as in Example 3 except that, in the "Preparation of Non-Aqueous Electrolyte" in Example 3, 60% by volume of a compound, in which hydrogen elements in the ethoxy groups in the phosphazene derivative (chain EO type phosphazene derivative (a compound in which, in general formula (1), X has a structure of group (A) represented by general formula (3), all of $Y^1$ to $Y^3$ and $Y^5$ to $Y^6$ are single bonds, all of $R^1$ to $R^3$ and $R^5$ to $R^6$ are ethoxy groups, and Z is oxygen)) were substituted by fluorine (the amount of fluorine elements in the phosphazene derivative: 12.4% by weight), was added instead of adding 20% by volume of the phosphazene derivative (chain EO type phosphazene derivative (a compound in which, in general formula (1), X has a structure of group (A) represented by general formula (3), all of $Y^1$ to $Y^3$ and $Y^5$ to $Y^6$ are single bonds, all of $R^1$ to $R^3$ and $R^5$ to $R^6$ are ethoxy groups, and Z is oxygen)). The self-extinguishability or incombustibility of the resultant non-aqueous electrolyte was evaluated. Further, a non-aqueous electrolyte secondary cell was manufactured in the same manner as in Example 3. Initial cell characteristics (voltage and internal resistance), the charge-and-discharge cycle performance, and the discharge properties at low temperatures of the cell were measured and evaluated. Results are shown in Table 2.

Example 6

A non-aqueous electrolyte was prepared in the same manner as in Example 3 except that, in the "Preparation of Non-Aqueous Electrolyte" in Example 3, the added amount of the mixed solvent of ethylene carbonate and diethyl carbonate (mixing ratio (volume ratio): ethylene carbonate/diethyl carbonate=1/1) was changed from 40 ml to 48.5 ml, the added amount of the phosphazene derivative (chain EO type phosphazene derivative (a compound in which, in general formula (1), X has a structure of group (A) represented by general formula (3), all of $Y^1$ to $Y^3$ and $Y^5$ to $Y^6$ are single bonds, all of $R^1$ to $R^3$ and $R^5$ to $R^6$ are ethoxy groups, and Z is oxygen)) (aprotic organic solvent) was changed from 10 ml (20% by volume) to 1.5 ml (3% by volume), and $LiBF_4$ (supporting salt) was replaced by $LiPF_6$ (supporting salt). The self-extinguishability or incombustibility of the resultant non-aqueous electrolyte was evaluated. Further, a non-aqueous electrolyte secondary cell was manufactured in the same manner as in Example 3. Initial cell characteristics (voltage and internal resistance), the charge-and-discharge cycle performance, and the discharge properties at low temperatures of the cell were measured and evaluated. Results are shown in Table 2.

Comparative Example 2

A non-aqueous electrolyte was prepared in the same manner as in Example 3 except that, in the "Preparation of Non-Aqueous Electrolyte" in Example 3, the phosphazene derivative (chain EO type phosphazene derivative (a compound in which, in general formula (1), X has a structure of group (A) represented by general formula (3), all of $Y^1$ to $Y^3$ and $Y^5$ to $Y^6$ are single bonds, all of $R^1$ to $R^3$ and $R^5$ to $R^6$ are ethoxy groups, and Z is oxygen)) was not used, and the added amount of the mixed solvent of diethyl carbonate and ethylene carbonate (mixing ratio (volume ratio): diethyl carbonate/ethylene carbonate 1/1) (aprotic organic solvent) was changed to 50 ml. The self-extinguishability or incombustibility of the resultant non-aqueous electrolyte was evaluated. Further, a non-aqueous electrolyte secondary cell was manufactured in the same manner as in Example 3. Initial cell characteristics (voltage and internal resistance), the charge-and-discharge cycle performance, and the discharge properties at low temperatures of the cell were measured and evaluated. Results are shown in Table 2.

months in the glovebox were visually observed, and no changes were detected.

Evaluation of Discharge Properties at Low Temperatures (Measurement of Discharge Capacities at Low Temperatures)

Charge and discharge were repeated up to 50 cycles under the following conditions: an uppermost voltage of 4.5 V, a lowermost voltage of 3.0 V, a discharge current of 100 mA, and a charge current of 50 mA. At this time, charge was carried out at 20° C., and discharge was carried out at low temperatures (−20° C., −0° C.). Discharge capacity obtained at each of the low temperatures was compared with the discharge capacity obtained at 20° C., and reduction ratio of the discharge capacity was calculated in accordance with the following expression. Results are shown in Table 3.

Expression: reduction ratio of discharge capacity=100−(discharge capacity at a low temperature/discharge capacity (20° C.))×100 (%)

TABLE 2

| | Measurement and evaluation of cell characteristics | | | Evaluation of discharge properties at low temperatures (reduction ratio of discharge capacity after 50 cycles) | | |
|---|---|---|---|---|---|---|
| | Voltage (V) | Internal pressure (mΩ) | Reduction ratio of discharge capacity after 50 cycles (%) | Temperature at the time of discharge: −10° C. | Temperature at the time of discharge: −20° C. | Evaluation of self-extinguishability or incombustibility |
| Example 3 | 2.85 | 200 | 5 | 40% or less | 70% or less | Self-extinguishable |
| Example 4 | 2.85 | 215 | 5 | 40% or less | 70% or less | Incombustible |
| Example 5 | 2.90 | 225 | 5 | 40% or less | 70% or less | Incombustible |
| Example 6 | 2.85 | 200 | 5 | 40% or less | 70% or less | Incombustible |
| Comparative Example 2 | 2.80 | 190 | 4 | 50% or more | 85% or more | Combustible |

In Examples 3 to 6, the non-aqueous electrolytes have excellent self-extinguishability or incombustibility. It can be seen that the second aspect of the non-aqueous electrolyte secondary cell of the present invention is excellent in safety.

Examples 7 to 8 and Comparative Examples 3 to 4 of the deterioration inhibitor for the non-aqueous electrolyte secondary cell are described hereinafter. However, the present invention is not limited to the Examples and the Comparative Examples.

Example 7

[Preparation of Non-Aqueous Electrolyte]

To 49 ml of γ-butyrolactone (aprotic organic solvent), 1 ml (2% by volume) of a phosphazene derivative (chain EO type phosphazene derivative (a compound in which, in general formula (1), X has a structure of group (A) represented by general formula (3), all of $Y^1$ to $Y^3$ and $Y^5$ to $Y^6$ are single bonds, all of $R^1$ to $R^3$ and $R^5$ to $R^6$ are ethoxy groups, and Z is oxygen)) (a deterioration inhibitor for a non-aqueous electrolyte secondary cell) was added. Further, $LiPF_6$ (lithium salt) was dissolved in the resultant mixture at a concentration of 0.5 moles/kg to prepare a non-aqueous electrolyte.

Evaluation of Deterioration

The moisture percentages (ppm), the concentrations of hydrogen fluoride (ppm), and charge and discharge capacities (mAh/g) of the resultant non-aqueous electrolyte immediately after preparation thereof and after being left for two months in a glovebox were measured and calculated in the same manner as the above-described "Stability Evaluation Method". Results are shown in Table 3.

Color tone changes of the non-aqueous electrolyte immediately after preparation thereof and after being left for two months in the glovebox were visually observed, and no changes were detected.

Example 8

A non-aqueous electrolyte was prepared in the same manner as in Example 7 except that, in the "Preparation of Non-Aqueous Electrolyte" in Example 7, the added amount of the phosphazene derivative (chain EO type phosphazene derivative (a compound in which, in general formula (1), X has a structure of group (A) represented by general formula (3), all of $Y^1$ to $Y^3$ and $Y^5$ to $Y^6$ are single bonds, all of $R^1$ to $R^3$ and $R^1$ to $R^6$ are ethoxy groups, and Z is oxygen)) (the deterioration inhibitor for a non-aqueous electrolyte secondary cell) in the non-aqueous electrolyte was changed to 50% by volume. The deterioration and the discharge properties at low temperatures of the resultant non-aqueous electrolyte were evaluated. Results are shown in Table 3.

Color tone changes of the non-aqueous electrolyte immediately after preparation thereof and after being left for two months in the glovebox were visually observed, and no changes were detected.

Comparative Example 3

A non-aqueous electrolyte was prepared in the same manner as in Example 7 except that, in the "Preparation of Non-Aqueous Electrolyte" in Example 7, the added amount of γ-butylolactone (aprotic organic solvent) was changed to 50 ml, and the phosphazene derivative (chain EO type phosphazene derivative (a compound in which, in general formula (1), X has a structure of group (A) represented by general formula (3), all of $Y^1$ to $Y^3$ and $Y^5$ to $Y^6$ are single bonds, all of $R^1$ to $R^3$ and $R^5$ to $R^6$ are ethoxy groups, and Z is oxygen)) (the deterioration inhibitor for a non-aqueous electrolyte secondary cell) was not used. The deterioration and the discharge properties at low temperatures of the resultant non-aqueous electrolyte were evaluated. Results are shown in Table 3.

Color tone changes of the non-aqueous electrolyte immediately after preparation thereof and after being left for two months in the glovebox were visually observed. It was observed that the color of the non-aqueous electrolyte had turned black after the non-aqueous electrolyte was left for two months in the glovebox.

Comparative Example 4

A non-aqueous electrolyte was prepared in the same manner as in Example 7 except that, in the "Preparation of Non-Aqueous Electrolyte" in Example 7, 50 ml of ethylene carbonate/diethyl carbonate (volume ratio: 1/1) (aprotic organic solvent) was used instead of 49 ml of γ-butylolactone (aprotic organic solvent), and the phosphazene derivative (chain EO type phosphazene derivative (a compound in which, in general formula (1), X has a structure of group (A) represented by general formula (3), all of $Y^1$ to $Y^3$ and $Y^5$ to $Y^6$ are single bonds, all of $R^1$ to $R^3$ and $R^5$ to $R^6$ are ethoxy groups, and Z is oxygen)) (the deterioration inhibitor for a non-aqueous electrolyte secondary cell) was not used. The deterioration and the discharge properties at low temperatures of the resultant non-aqueous electrolyte were evaluated. Results are shown in Table 3.

Color tone changes of the non-aqueous electrolyte immediately after preparation thereof and after being left for two months in the glovebox were visually observed. It was observed that the color of the non-aqueous electrolyte had turned black after the non-aqueous electrolyte was left for two months in the glovebox.

general formula (1), X has a structure of group (A) represented by general formula (3), all of $Y^2$ to $Y^3$ and $Y^5$ to $Y^6$ are single bonds, all of $R^1$ to $R^3$ and $R^5$ to $R^6$ are ethoxy groups, and Z is oxygen)) (an additive for a non-aqueous electrolyte secondary cell) was added. Further, $LiBF_4$ (lithium salt) was dissolved in the resultant mixture at a concentration of 0.5 moles/kg to prepare a non-aqueous electrolyte.

Evaluation of Self-Extinguishability or Incombustibility

The resultant non-aqueous electrolyte was evaluated as shown below in the same manner as the above-described "Evaluation Method for Self-Extinguishability or Incombustibility". Results are shown in Table 4.

Evaluation of Incombustibility

An evaluation of "incombustible" was recorded when an ignited flame did not reach a 25 mm line of a device and falling objects from a net did not catch flame.

Evaluation of Self-Extinguishability

An evaluation of "self-extinguishable" was recorded when an ignited flame was extinguished at a line between 25 mm to 100 mm and falling objects from a net did not catch flame.

Evaluation of Combustibility

An evaluation of "combustible" was recorded when an ignited flame crossed a 100 mm line.

[Manufacturing of Non-Aqueous Electrolyte Secondary Cell]

A cobalt oxide represented by chemical formula $LiCoO_2$ was used as a positive electrode active material. 10 parts of acetylene black (conductive assisting agent) and 10 parts of teflon binder (binder resin) were added to 100 parts of $LiCoO_2$, and the resultant mixture was kneaded with an

TABLE 3

| | Immediately after preparation of electrolyte | | | Left for two months (in glovebox) | | | Evaluation of discharge properties at low temperatures (reduction ratio of discharge capacity after 50 cycles) | | |
|---|---|---|---|---|---|---|---|---|---|
| | Charge and discharge capacity (mAh/g) | HF concentration | Moisture percentage (ppm) | Charge and discharge capacity (mAh/g) | HF concentration (ppm) | Moisture percentage (ppm) | Temperature at the time of discharge: −10° C. | Temperature at the time of discharge: −20° C. | Evaluation |
| Example 7 | 145 | 5 ppm or less | 20 | 143 | 0 | 20 | 40% or less | 70% or less | High stability, excellent resistance to deterioration |
| Example 8 | 145 | 5 ppm or less | 20 | 145 | 0 | 20 | 40% or less | 70% or less | Very high stability, extremely excellent resistance to deterioration |
| Comparative Example 3 | 145 | 5 ppm or less | 20 | 20 | 40 | 2 | 50% or more | 85% or more | Low stability, occurrence of deterioration |
| Comparative Example 4 | 145 | 5 ppm or less | 20 | 30 | 40 | 3 | 50% or more | 85% or more | Low stability, occurrence of deterioration |

Examples 9 to 12 and Comparative Example 5 of the additive for the non-aqueous electrolyte secondary cell are described hereinafter. However, the present invention is not limited to the Examples and the Comparative Example.

Example 9

[Preparation of Non-Aqueous Electrolyte]

To 80 ml of a mixed solvent of ethylene carbonate and diethyl carbonate (mixing ratio (volume ratio): ethylene carbonate/diethyl carbonate=1/1) (aprotic organic solvent), 20 ml (20% by volume) of a phosphazene derivative (chain EO type phosphazene derivative (a compound in which, in organic solvent (mixed solvent of ethyl acetate/ethanol, 50/50% by volume). Thereafter, the resultant mixture was rolled into a thin positive electrode sheet having a thickness of 100 μm and a width of 40 mm.

Subsequently, an aluminum foil (collector) having a thickness of 25 μm, which had a surface coated with a conductive adhesive, was sandwiched between two of the positive electrode sheets thus obtained. A lithium metal foil having a thickness of 150 μm was superposed onto the resulting structure with a separator (microporous film of polypropylene) having a thickness of 25 μm being interposed therebetween. The resulting structure was wound up to manufacture a cylindrical electrode. The length of the positive electrode for the cylindrical electrode was about 260 mm.

The non-aqueous electrolyte was injected into the cylindrical electrode, and the cylindrical electrode was sealed to manufacture a AA lithium cell.

Measurement and Evaluation of Cell Characteristics

The initial characteristics (voltage and internal resistance) of the resultant cell at 20° C. were measured and evaluated. Thereafter, charge-and-discharge cycle performance of the cell was measured and evaluated by the following evaluation method. Results are shown in Table 4.

Evaluation of Charge-and-Discharge Cycle Performance

Charge and discharge were repeated up to 50 cycles under the following conditions: an uppermost voltage of 4.5 V, a lowermost voltage of 3.0 V, a discharge current of 100 mA, and a charge current of 50 mA. The charge and discharge capacity was compared with an initial charge and discharge capacity, and reduction ratio of the capacity after 50 cycles was calculated. The measurement and calculation were carried out for three cells in the same manner, and an average of the measured values for the three cells was calculated for evaluation of the charge-and-discharge cycle performance.

Evaluation of Discharge Properties at Low Temperatures (Measurement of Discharge Capacities at Low Temperatures)

Using the resultant non-aqueous electrolyte secondary cell, charge and discharge were repeated up to 50 cycles under the same conditions as in the "Evaluation of Charge-and-Discharge Cycle Performance", except that the temperatures at the time of discharge were low (−10° C., −20° C.). Discharge capacity obtained at each of the low temperatures was compared with a discharge capacity measured at 20° C., and reduction ratio of the discharge capacity was calculated in accordance with the following expression. The measurement and calculation were carried out for three cells in the same manner, and an average of the measured values for the three cells was calculated for evaluation of the discharge properties at low temperatures. Results are shown in Table 4.

Expression: reduction ratio of discharge capacity=100−(discharge capacity at a low temperature/discharge capacity (20° C.))×100 (%)

Example 10

A non-aqueous electrolyte was prepared in the same manner as in Example 9 except that, in the "Preparation of Non-Aqueous Electrolyte" in Example 9, the added amount of the phosphazene derivative (chain EO type phosphazene derivative (a compound in which, in general formula (1), X has a structure of group (A) represented by general formula (3), all of $Y^1$ to $Y^3$ and $Y^5$ to $Y^6$ are single bonds, all of $R^1$ to $R^3$ and $R^5$ to $R^6$ are ethoxy groups, and Z is oxygen)) (the additive for a non-aqueous electrolyte secondary cell) in the lion-aqueous electrolyte was changed to 80% by volume. The self-extinguishability extinguishability or incombustibility of the resultant non-aqueous electrolyte was evaluated. Further, a non-aqueous electrolyte secondary cell was manufactured in the same manner as in Example 9. Initial cell characteristics (voltage and internal resistance), the charge-and-discharge cycle performance, and the discharge properties at low temperatures of the cell were measured and evaluated. Results are shown in Table 4.

Example 11

A non-aqueous electrolyte was prepared in the same manner as in Example 9 except that, in the "Preparation of Non-Aqueous Electrolyte" in Example 9, a compound, in which hydrogen elements in the ethoxy groups in the phosphazene derivative (chain EO type phosphazene derivative (a compound in which, in general formula (1), X has a structure of group (A) represented by general formula (3), all of $Y^1$ to $Y^3$ and $Y^5$ to $Y^6$ are single bonds, all of $R^1$ to $R^3$ and $R^5$ to $R^6$ are ethoxy groups, and Z is oxygen)) (the additive for a non-aqueous electrolyte secondary cell) were substituted by fluorine elements (the amount of fluorine elements in the phosphazene derivative: 15% by weight), was used as the additive for a non-aqueous electrolyte secondary cell. The self-extinguishability or incombustibility of the resultant non-aqueous electrolyte was evaluated. Further, a non-aqueous electrolyte secondary cell was manufactured in the same manner as in Example 9. Initial cell characteristics (voltage and internal resistance), the charge-and-discharge cycle performance, and the discharge properties at low temperatures of the cell were measured and evaluated. Results are shown in Table 4.

Example 12

A non-aqueous electrolyte was prepared in the same manner as in Example 9 except that, in the "Preparation of Non-Aqueous Electrolyte" in Example 9, the added amount of the mixed solvent of ethylene carbonate and diethyl carbonate (mixing ratio (volume ratio): ethylene carbonate/diethyl carbonate=1/1) was changed from 80 ml to 97 ml, the added amount of the phosphazene derivative (chain EO type phosphazene derivative (a compound in which, in general formula (1), X has a structure of group (A) represented by general formula (3), all of $Y^2$ to $Y^3$ and $Y^5$ to $Y^6$ are single bonds, all of $R^1$ to $R^3$ and $R^5$ to $R^6$ are ethoxy groups, and Z is oxygen)) (the additive for a non-aqueous electrolyte secondary cell) was changed from 20 ml (20% by volume) to 3 ml (3% by volume), and $LiBF_4$ (supporting salt) was replaced by $LiPF_6$ (supporting salt). The self-extinguishability or incombustibility of the resultant non-aqueous electrolyte was evaluated. Further, a non-aqueous electrolyte secondary cell was manufactured in the same manner as in Example 9. Initial cell characteristics (voltage and internal resistance), the charge-and-discharge cycle performance, and the discharge properties at low temperatures of the cell were measured and evaluated. Results are shown in Table 4.

Comparative Example 5

A non-aqueous electrolyte was prepared in the same manner as in Example 9 except that, in the "Preparation of Non-Aqueous Electrolyte" in Example 9, the phosphazene derivative (chain EO type phosphazene derivative (a compound in which, in general formula (1), X has a structure of group (A) represented by general formula (3), all of $Y^1$ to $Y^3$ and $Y^5$ to $Y^6$ are single bonds, all of R" to $R^3$ and $R^1$ to $R^6$ are ethoxy groups, and Z is oxygen)) (the additive for a non-aqueous electrolyte secondary cell) was not used, and the added amount of the mixed solvent of diethyl carbonate and ethylene carbonate (aprotic organic solvent) was changed to 100 ml. The self-extinguishability or incombustibility of the resultant non-aqueous electrolyte was evaluated. Further, a non-aqueous electrolyte secondary cell was manufactured in the same manner as in Example 9. Initial cell characteristics (voltage and internal resistance), the charge-and-discharge cycle performance, and the discharge properties at low temperatures of the cell were measured and evaluated. Results are shown in Table 4.

TABLE 4

| | Measurement and evaluation of cell characteristics | | | Evaluation of discharge properties at low temperatures (reduction ratio of discharge capacity after 50 cycles) | | |
|---|---|---|---|---|---|---|
| | Voltage (V) | Internal pressure (mΩ) | Reduction ratio of discharge capacity after 50 cycles (%) | Temperature at the time of discharge: −10° C. | Temperature at the time of discharge: −20° C. | Evaluation of self-extinguishability or incombustibility |
| Example 9 | 2.85 | 200 | 5 | 40% or less | 70% or less | Self-extinguishable |
| Example 10 | 2.85 | 210 | 5 | 40% or less | 70% or less | Incombustible |
| Example 11 | 2.90 | 230 | 5 | 40% or less | 70% or less | Incombustible |
| Example 12 | 2.85 | 200 | 5 | 40% or less | 70% or less | Incombustible |
| Comparative Example 5 | 2.80 | 180 | 3 | 50% or more | 85% or more | Combustible |

It can be seen that the non-aqueous electrolytes in Examples 9 to 12 have excellent self-extinguishability or incombustibility, and are excellent in safety when the additive for a non-aqueous electrolyte secondary cell of the present invention is used. Particularly, in Examples 11 and 12, it can be seen that the additive for a non-aqueous electrolyte secondary cell can provide excellent incombustibility even if the added amount of the additive for a non-aqueous electrolyte secondary cell is small.

INDUSTRIAL APPLICABILITY

The first aspect of the non-aqueous electrolyte secondary cell has excellent resistance to deterioration, includes a non-aqueous electrolyte having a low interface resistance, and has excellent discharge properties at low temperatures, while maintaining characteristics and the like required for a cell.

The second aspect of the non-aqueous electrolyte secondary cell has excellent self-extinguishability or incombustibility, includes a non-aqueous electrolyte having a low interface resistance, and has excellent discharge properties at low temperatures, while maintaining characteristics and the like required for a cell.

The deterioration inhibitor for a non-aqueous electrolyte secondary cell, which is added into the non-aqueous electrolyte in the non-aqueous electrolyte secondary cell, can prevent deterioration of the non-aqueous electrolyte, can lower the interface resistance of the non-aqueous electrolyte, and can give excellent discharge properties at low temperatures, while maintaining characteristics required for a cell, such as charge and discharge capacity.

The additive for a non-aqueous electrolyte secondary cell, which is added into the non-aqueous electrolyte in the non-aqueous electrolyte secondary cell, can lower the interface resistance of the non-aqueous electrolyte and give self-distinguishability or incombustibility and excellent discharge properties at low temperatures to the non-aqueous electrolyte, while maintaining characteristics and the like required for a cell.

What is claimed is:

1. A non-aqueous electrolyte secondary cell comprising:
    a positive electrode;
    a negative electrode; and
    a non-aqueous electrolyte including at least 2% by volume and less than 20% by volume of a phosphazene derivative, and a supporting salt
    wherein the phosphazene derivative has the formula

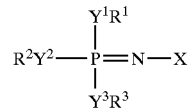

wherein $R^1$, $R^2$ and $R^3$ independently represent monovalent substituent or halogen, $Y^1$, $Y^2$ and $Y^3$ independently represent bivalent connecting groups, bivalent element or single bonds, and X represents a group which is at least one element selected from a group consisting of carbon, silicon, germanium, tin, nitrogen phosphorous, arsenic, antimony bismuth, oxygen, selenium, tellurium, and polonium.

2. The non-aqueous electrolyte secondary cell recited in claim 1, wherein the non-aqueous electrolyte includes at least 3% by volume and less than 20% by volume of the phosphazene derivative.

3. The non-aqueous electrolyte secondary cell recited in claim 1, wherein the supporting salt is $LiPF_6$ salt, and the non-aqueous electrolyte includes a cyclic or chain ester compound.

4. A non-aqueous electrolyte secondary cell comprising:
    a positive electrode;
    a negative electrode; and
    a non-aqueous electrolyte including at least 20% by volume of a phosphazene derivative, and a supporting salt
    wherein the phosphazene derivative has the formula

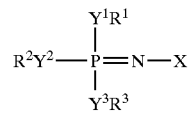

wherein $R^1$, $R^2$ and $R^3$ independently represent monovalent substituent or halogen, $Y^1$, $Y^2$ and $Y^3$ independently represent bivalent connecting groups, bivalent element or single bonds, and X represents a group which is at least one element selected from a group consisting of carbon, silicon, germanium, tin, nitrogen, phosphorous, arsenic, antimony, bismuth, oxygen, selenium, tellurium, and polonium.

5. The non-aqueous electrolyte secondary cell recited in claim 4, wherein the non-aqueous electrolyte includes at least 30% by volume of the phosphazene derivative.

6. The non-aqueous electrolyte secondary cell recited in claim 4, wherein the phosphazene derivative has a substituent including a halogen element in the molecular structure.

7. The non-aqueous electrolyte secondary cell recited in claim 6, wherein content of the halogen element in the phosphazene derivative is 2 to 80% by weight.

8. A non-aqueous electrolyte secondary cell comprising:
a positive electrode;
a negative electrode; and
a non-aqueous electrolyte including $LiPF_6$, ethylene carbonate, and more than 2.5% by volume of a phosphazene derivative
wherein the phosphazene derivative has the formula

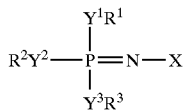

wherein $R^1$, $R^2$ and $R^3$ independently represent monovalent substituent or halogen, $Y^1$, $Y^2$ and $Y^3$ independently represent bivalent connecting groups, bivalent element or single bonds, and X represents a group which is at least one element selected from a group consisting of carbon, silicon, germanium, tin, nitrogen, phosphorous, arsenic, antimony, bismuth, oxygen, selenium, tellurium, and polonium.

9. A deterioration inhibitor for a non-aqueous electrolyte secondary cell, which includes at least a phosphazene derivative and is added, in an amount of at least 3% by volume and less than 20% by volume, to a non-aqueous electrolyte in the non-aqueous electrolyte secondary cell containing a non-aqueous electrolyte including a supporting salt and an organic solvent
wherein the phosphazene derivative has the formula

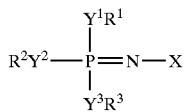

wherein $R^1$, $R^2$ and $R^3$ independently represent monovalent substituent or halogen, $Y^1$, $Y^2$ and $Y^3$ independently represent bivalent connecting groups, bivalent element or single bonds, and X represents a group which is at least one element selected from a group consisting of carbon, silicon, germanium, tin, nitrogen, phosphorous, arsenic, antimony, bismuth, oxygen, selenium, tellurium, and polonium.

10. An additive for a non-aqueous electrolyte secondary cell, which includes at least a phosphazene derivative and is added to a non-aqueous electrolyte in the non-aqueous electrolyte secondary cell containing a non-aqueous electrolyte including a supporting salt and an organic solvent
wherein the phosphazene derivative has the formula

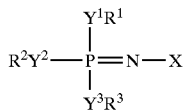

wherein $R^1$, $R^2$ and $R^3$ independently represent monovalent substituent or halogen, $Y^1$, $Y^2$ and $Y^3$ independently represent bivalent connecting groups, bivalent element or single bonds, and X represents a group which is at least one element selected from a group consisting of carbon, silicon, germanium, tin, nitrogen, phosphorous, arsenic, antimony, bismuth, oxygen, selenium, tellurium, and polonium.

11. The additive for a non-aqueous electrolyte secondary cell recited in claim 10, whose added amount to the non-aqueous electrolyte is at least 30% by volume and at most 90% by volume and which is used as a fire-resistance agent for the non-aqueous electrolyte secondary cell.

12. The additive for the non-aqueous electrolyte secondary cell recited in claim 10, wherein the supporting salt includes $LiPF_6$, the organic solvent includes ethylene carbonate, and the added amount of the additive to the non-aqueous electrolyte is 1.5 to 2.5% by volume.

13. The additive for the non-aqueous electrolyte secondary cell recited in claim 10, wherein the supporting salt includes $LiPF_6$, the organic solvent includes ethylene carbonate, and the added amount of the additive to the non-aqueous electrolyte is more than 2.5% by volume and at most 90% by volume.

14. A deterioration inhibitor for a non-aqueous electrolyte secondary cell, which includes at least a phosphazene derivative and is added, in an amount of at least 2% and less than 20% by volume, to a non-aqueous electrolyte in the non-aqueous electrolyte secondary cell containing a non-aqueous electrolyte including a supporting salt and an organic solvent
wherein the phosphazene derivative has the formula

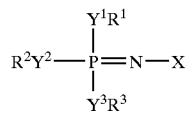

wherein $R^1$, $R^2$ and $R^3$ independently represent monovalent substituent or halogen, $Y^1$, $Y^2$ and $Y^3$ independently represent bivalent connecting groups, bivalent element or single bonds, and X represents a group which is at least one element selected from a group consisting of carbon, silicon, germanium, tin, nitrogen, phosphorous, arsenic, antimony bismuth, oxygen, selenium, tellurium, and polonium.

15. The additive for the non-aqueous electrolyte secondary cell recited in claim 10, whose added amount to the non-aqueous electrolyte is at least 20% by volume and less than 30% by volume and which is used as a self-extinguishing agent for the non-aqueous electrolyte secondary cell.

16. The non-aqueous electrolyte secondary cell recited in claim 2, wherein the supporting salt is $LiPF_6$ salt, and the non-aqueous electrolyte includes a cyclic or chain ester compound.

17. The non-aqueous electrolyte secondary cell recited in claim 5, wherein the phosphazene derivative has a substituent including a halogen element in the molecular structure.

* * * * *